Dec. 23, 1969   W. K. CROWDER ET AL   3,485,182
SLIDEWALK APPARATUS AND SYSTEM
Filed Jan. 27, 1967   4 Sheets-Sheet 3

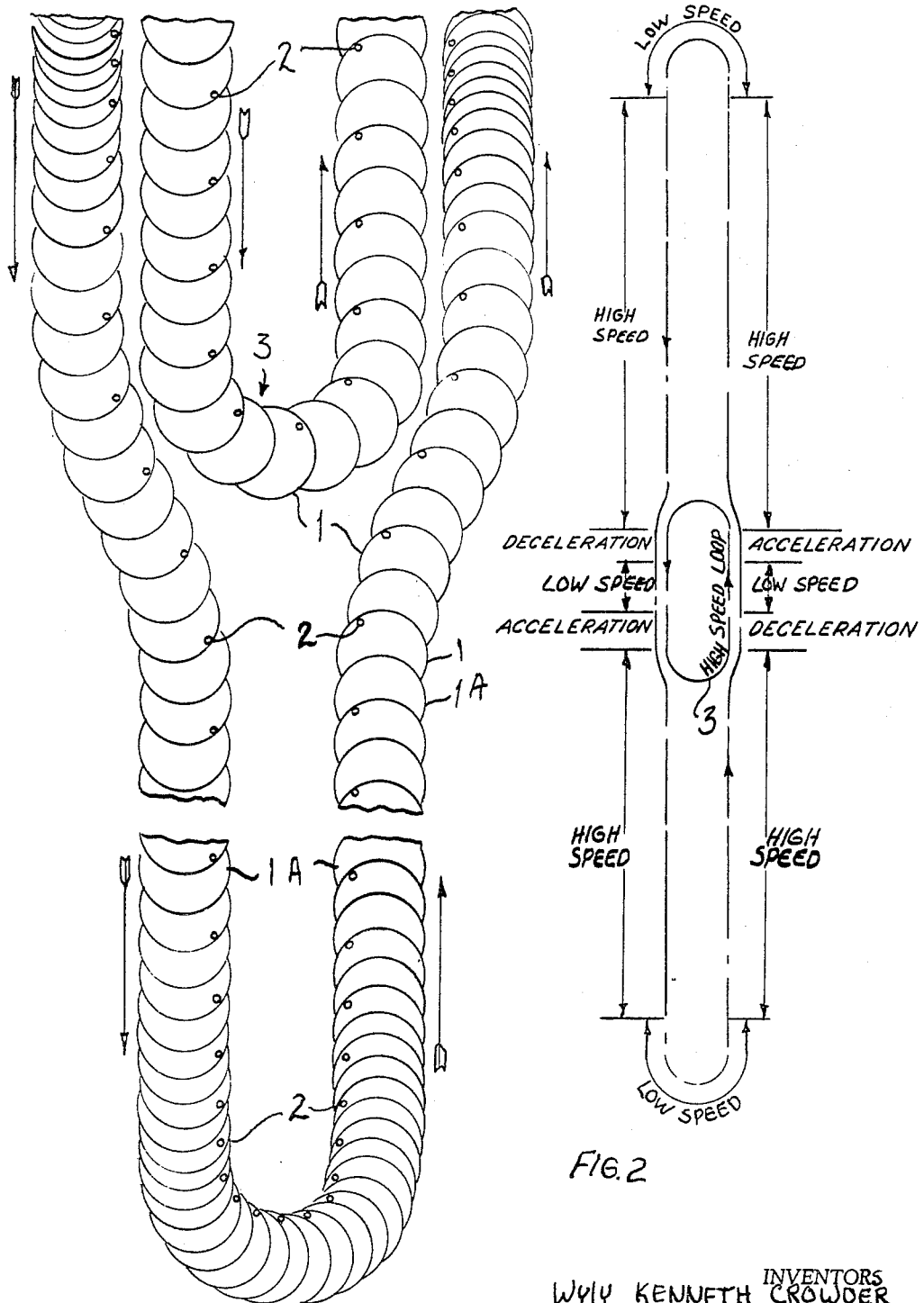

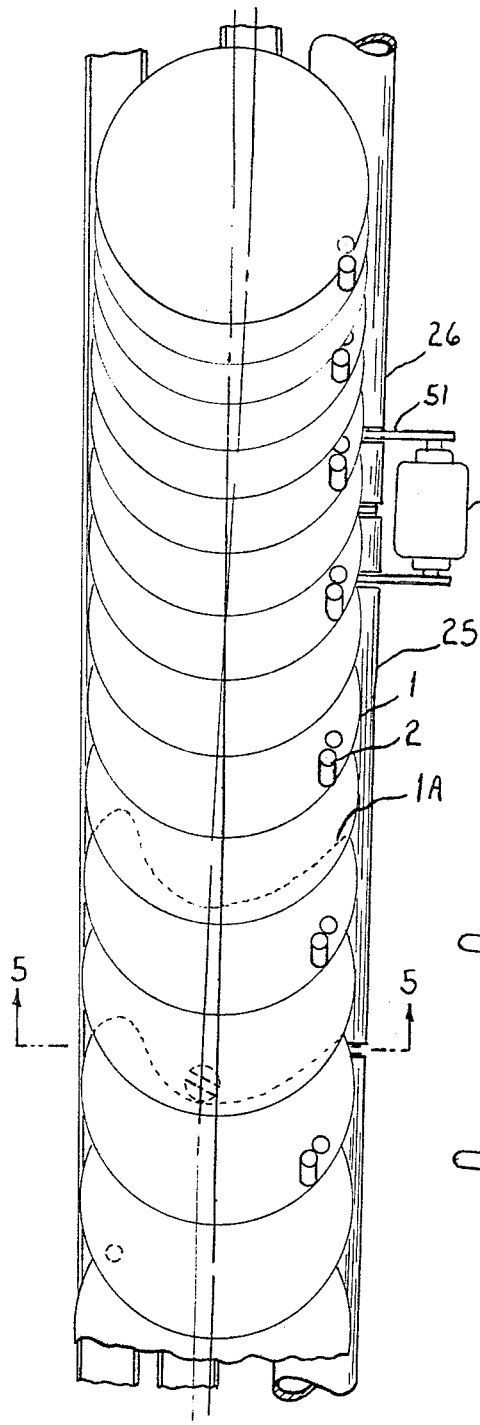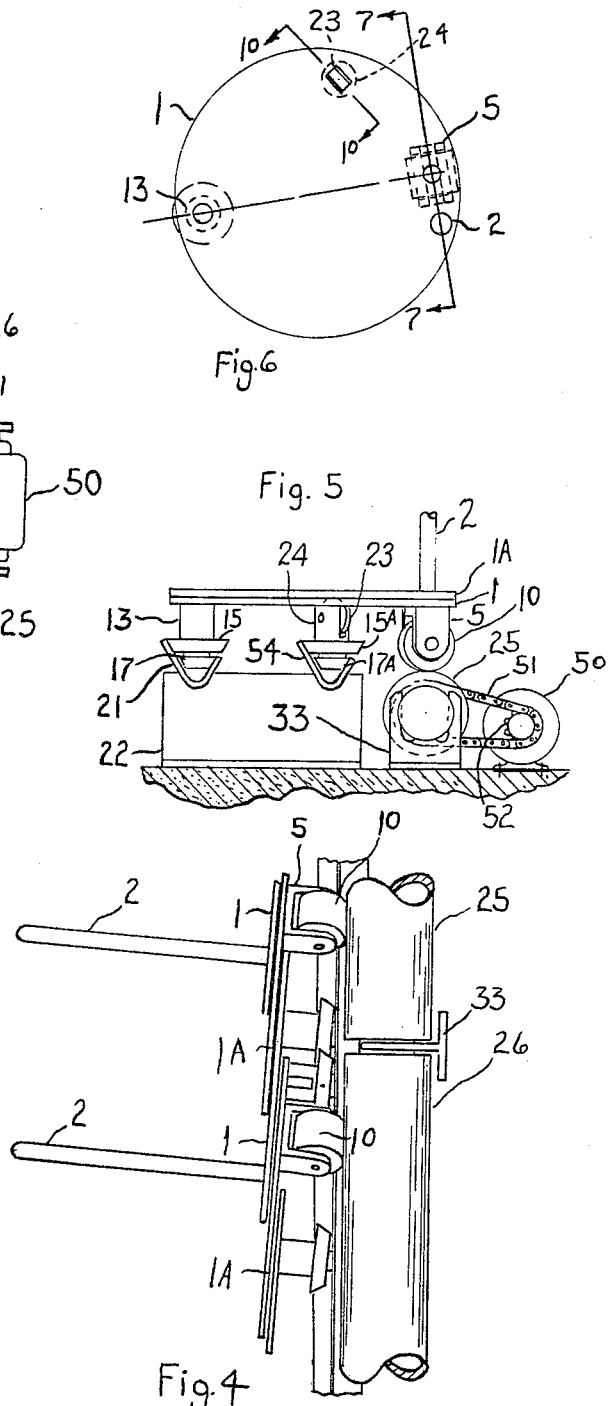

INVENTORS
WYLY KENNETH CROWDER
BY THOMAS A. MURPHY
James T. Barr
ATTY.

Dec. 23, 1969  W. K. CROWDER ET AL  3,485,182
SLIDEWALK APPARATUS AND SYSTEM
Filed Jan. 27, 1967  4 Sheets-Sheet 4

INVENTORS
WYLY KENNETH CROWDER
BY THOMAS A. MURPHY
James T. Barr
ATTY.

United States Patent Office 3,485,182
Patented Dec. 23, 1969

3,485,182
SLIDEWALK APPARATUS AND SYSTEM
Wyly Kenneth Crowder, Pontiac, and Thomas A. Murphy,
Detroit, Mich., assignors to Docutel Corporation, Dallas, Tex., a corporation of Delaware
Filed Jan. 27, 1967, Ser. No. 612,194
Int. Cl. B61k 1/00; B61b 1/00; B65g 17/06
U.S. Cl. 104—25                                    15 Claims

ABSTRACT OF THE DISCLOSURE

A slidewalk system for transporting both human and merchandise loads along a continuous chain in which articulated platforms are utilized to permit flexible operation and wherein the system is powered by a linear motor, for example.

DESCRIPTION

The primary purpose of this invention is to provide a novel improvement in high speed transportation that substitutes for the prevailing inefficient, inadequate or complex methods, an improved system of automatic load transfer of variable speed to and from a constant speed conveyance of substantially great length. For example, prior art systems such as shown in Sach's Patent No. 1,412,896 illustrates the complexity and inefficiency that would ordinarily be required to effect the results envisaged by the present invention.

The present invention provides a transportation system or slidewalk in which two or more continuous platform chains, one of which continuously operates at a high speed average, but not a constant speed, while the speed of the other platform chain varies in cycles between a very low speed and a maximum speed which is very nearly equal to the minimum speed of the high speed platform chain. Passengers are able to board the low speed platform which is then accelerated to approximate the speed of the high speed platform to permit passengers to step onto a high speed platform at nearly relatively similiar speeds to accommodate facile transference therebetween. The low speed or boarding platform is then decelerated to a waiting station for the convenience of another passenger or cargo load.

Therefore it is an object of this invention to provide a pedestrian or cargo transportation system of relatively simple configuration having minimum number of parts to accomplish safe, rapid and efficient operation.

Another object of the invention is to provide a variable speed drive system utilizing a linear motor as the operating means.

Still another object of the invention is to provide roller driving means including individual electric motors.

It is further an object of the invention to provide a novel roller drive system for the pedestrian carrying discs or platforms.

It is further an object of the invention to provide an articulated platform or disc system in which the platforms or discs form an integral part of a lazy tong linkage.

These and other objects will be more particularly emphasized in the following specification with reference to the accompanying drawings, in which:

FIG. 1 is a plan view of a part of the continuous variable speed slidewalk;

FIG. 2 is a schematic view of a representative application of the slidewalk;

FIG. 3 is a plan view of a section of the slidewalk that changes from high speed to slow speed;

FIG. 4 is side elevation view of a part of FIG. 3;

FIG. 5 is a sectional view taken along the lines 5—5 of FIG. 3, illustrating a representative motor drive assembly;

FIG. 6 is a plan view of the discs showing points of suspension and relationship with a hand holding post;

OPERATION FROM THE USERS STAND POINT

Figure 7:
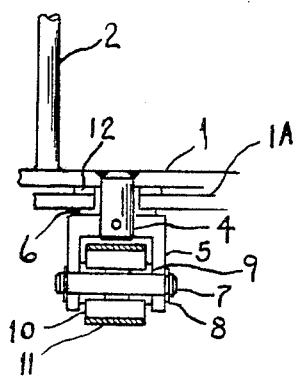
FIG. 7 is a view of FIG. 6, taken along the lines 7—7 partly in section showing one of the suspension point assemblies.

Referring to FIGS. 1 and 2 a pedestrian, approaching the slidewalk, will see a loop or row of moving discs or relatively circular platforms which provide the horizontal carrying means for his transportation.

On every second disc there is shown a post 2 for hand holding by the pedestrian in transit on the moving slidewalk.

FIG. 2 illustrates schematically a central area designated "low speed" where pedestrians may step on the slidewalk or alight therefrom. Note, that on one side of the loop, the posts 2 will be coming towards the pedestrian, loop around at a walk speed and then accelerate away at a fast or running speed. The pedestrian will also see that the posts 2 are attached to platform discs 1 upon which it is possible to ride in an erect position. He will be able to step on one of the discs 1 while grasping a post 2 at the low or walking speed of the continuously moving slidewalk. For example, the low speed may be 3 m.p.h. which may be accelerated up to 9 m.p.h. in approximately twenty feet of travel.

At the end of a few hundred feet, the pedestrian will approach a slow down area, but just prior to this area, it will be observed that a high speed loop of walk runs parallel with the walk carrying him. If the pedestrian has not arrived at the destination, he simply steps across to the high speed loop 3 long enough to by-pass the low speed area, as shown in FIG. 2. Upon arriving at his destination he remains on the main loop which automatically decelerates to a low speed permitting him to step off the platform at his station of preference.

SYSTEM DESCRIPTION

In order to attain the foregoing desiderata the following description of the system will explain the means that are necessary.

In FIG. 3 there is shown a section of the main loop which accomplishes the change from high speed to low speed. Note, that every second disc 1A contains a post 2 and is crescent-shaped as shown by the dashed lines. It is also to be noted that the discs 1 and 1A have a converging axis such that the discs are spaced closer together in the low speed zones as opposed to the considerably wider spacing in the high speed zones (see also FIG. 1).

FIG. 4 which is a side elevation view of a portion of FIG. 3 shows the drive rollers 25 and 26 that both support and drive the slidewalk. Slotted pillow blocks 33 (FIGS. 4 and 5) support the rollers 25 and 26 and rest upon a solid surface such as a floor or roadway.

Note, that there are carrier rollers 10 on every other disc, disc 1 as shown, whose axes are not parallel with rollers 25 and 26 for a purpose to be hereinafter described.

Figure 10:
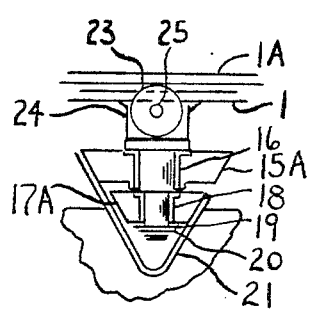
FIG. 10 is a sectional view taken along the lines 10—10 of FIG. 6, showing another suspension point assembly.

As shown in FIGS. 3 and 5, a representative electric motor 50 having a chain drive 51, co-operating with motor gear 52, drives the rollers 25 and 26. The rollers 25 and 26 in turn drive the carrier rollers 10 to move the discs 1 and 1A along the V-tracks 21 and 54 as will be more particularly described hereinafter. There are three suspension points for the discs 1, comprising posts 13, 24 and 5. The assembly post 13 is shown in FIG. 8. The assembly post 24 is shown in FIG. 10 and the assembly for post 5 is shown in FIG. 7.

FIG. 6 illustrates a plan view of one of the discs 1 showing in dotted lines the location of each of the suspension points 13, 24 and 5, and the relative location thereto of the hand hold post 2.

Figure 8:
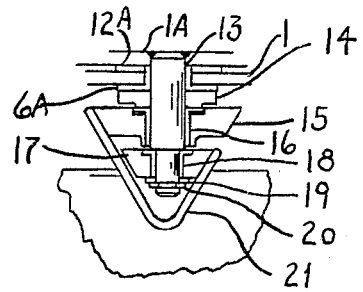
FIG. 8 is an enlarged view of a portion of FIG. 5 showing another suspension point assembly.

Referring now to FIG. 7, one of the suspension points or posts 5 is secured by suitable means to the pivot 4. Pivot 4 is rigidly secured to disc 1 at its upper surface and permits pivoting laterally within disc 1A by means of bushings 6 and 12. However longitudinal displacement is prohibited by means of pin 7 and bushings 9. A composition tire 11 shown in section, is adhesively mounted on roller 10 to cushion the travel between roller 10 and drive rollers 25 and 26. Note, that pivot 4 and post 5 in effect loosely couples the discs 1 and 1A such that pivoting action therebetween is permitted.

In FIG. 8, post 13 is shown rigidly secured to disc 1A at its upper surface and carries pivoted cone rollers 15 and 17 which are provided with wear bushings 16 and 18, respectively. The bushings 16 and 18 provide running clearance for the rollers 15 and 17. Spacer bushing 14 is provided to space the disc 1 from upper cone roller 15. Bushings 6A and 12A provide pivoting clearance for disc 1. Note, that the left side of the cone roller 15 rides within the upper extension of V-track 21, while the right side of cone roller 17 rides within the lower extension of V-track 21. Flange 19 and washer 20 complete the cone roller assembly to maintain a rigid but pivoted relationship between the discs 1, 1A and the V-track 21.

Figure 9:
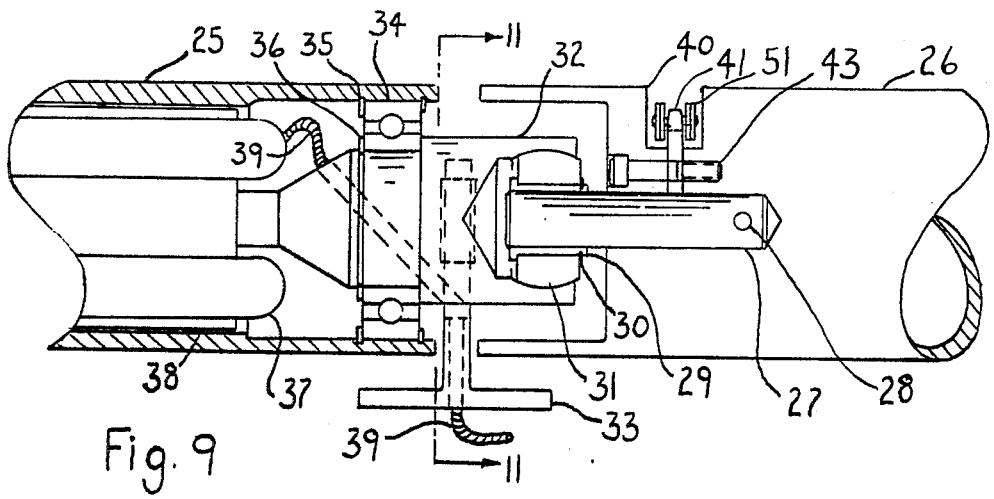
FIG. 9 is a side elevation view, partially in section of a portion of the slidewalk showing an alternative motor assembly.
Figure 11:
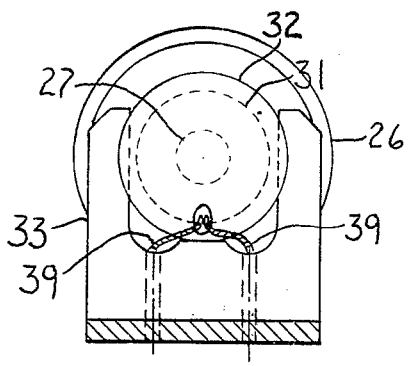
FIG. 11 is a sectional view taken along the lines 11—11 of FIG. 9.

FIGS. 9 and 11 illustrate a modified form of motor drive system different than the one shown in FIG. 5, in that the motor assembly is integrally located with respect to the drive rollers 25 and 26. As shown, pillow block 33 supports the entire assembly which contains a spherical stationary bearing 31 and motor shaft 32. The bearing 31 and motor shaft 32 support motor stator 38 and motor windings 37. A source of electric power supply (not shown) is connected by wires 39 to the windings 37 to induce a rotating magnetic field about said stator 38 to drive the roller 25.

The motor shaft carries motor stator 38 and windings 37. In addition the motor shaft 32 also supports a spherical bearing 31 and sleeve bearing 29 to provide a free running support of drive roller 26 via roller pin 27 and connecting pin 28.

An alternative driving means for the roller 26 is shown in FIG. 9. A chain 51 is engageable with a sprocket 41 to ride within a slot 40 and within the roller 26. The sprocket in turn is secured to a pin 43 attached to roller 26 as well as engaging roller pin 27.

In FIG. 10, the post 24, of the yoke type, is illustrated which is rigidly secured to disc 1 by welding or other suitable means. A supporting clearance roller 23, having a pin 25 provides pivotal engagement between disc 1A and the main roller assembly. The main roller assembly includes conical rollers 15A and 17A, similar to the elements and functions heretofore described in connection with FIG. 8.

Figure 12:
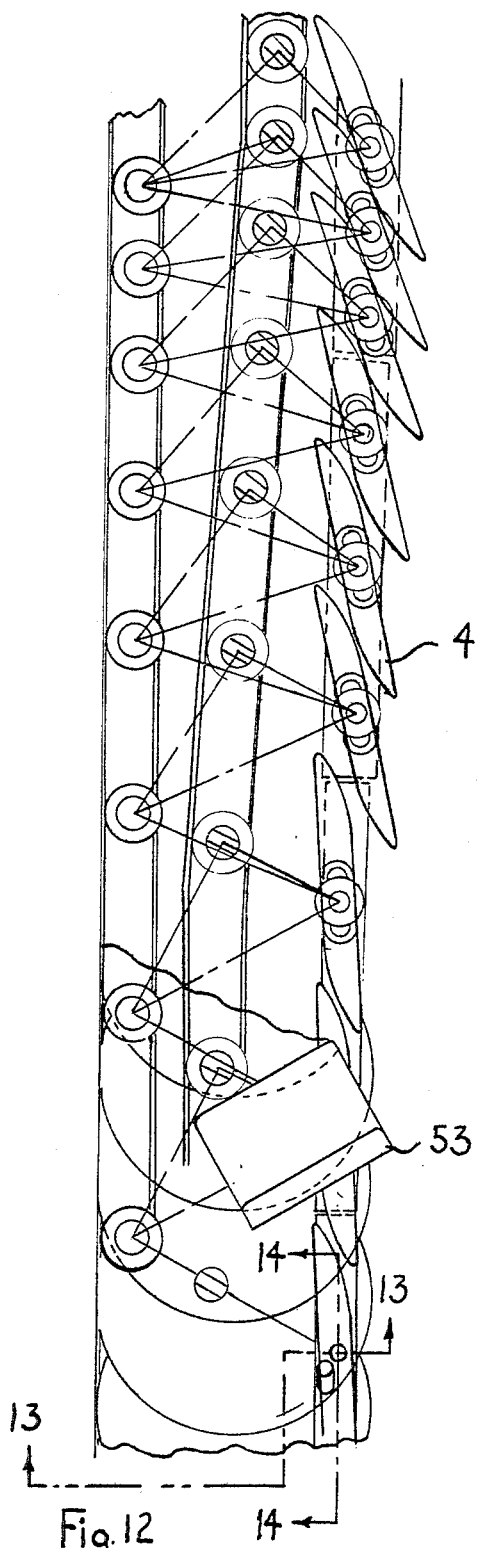
FIG. 12 is a fragmentary view of the variable speed slidewalk utilizing a linear motor drive.

FIG. 12, which is a fragmentary view similar to a portion of FIG. 1, illustrates another modification of a drive system utilizing a linear motor drive. An optional chair 53 is shown in this view as a substitute for the hand hold post 2. The pedestrian platform discs 1 are not shown in their entirety so that the sliding shoes 46 of the linear motor may be shown. The linear motor is more particularly described in U.S. Patent 3,403,634. Note, that the sliding shoes 46 are so shaped to take maximum advantage of the contiguous face area of the linear motor stators 48, as is more particularly shown in FIG. 14.

Figure 13:
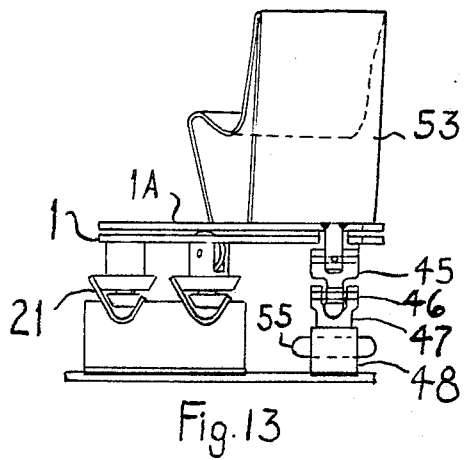
FIG. 13 is a sectional view taken along the lines 13—13 of FIG. 12.

FIG. 13, which is a sectional view of FIG. 12, taken along the lines 13—13, shows a modification utilizing a chair 53 as an alternative to the handpost 2 in which the pedestrian may be seated during his travel on this transportation system. In this view, one of the sliding shoes 46 is shown having a face 47 in juxtaposition to the linear motor stator 48. The stator 48 contains windings 55 (also note FIG. 14), which are integrally located with respect to the continuous stator 48. The rocker post 45 permits the platform disc 1 to rock without influencing or effecting the flat alignment of shoe face 47 and the upper face of stator 48.

Figure 14:
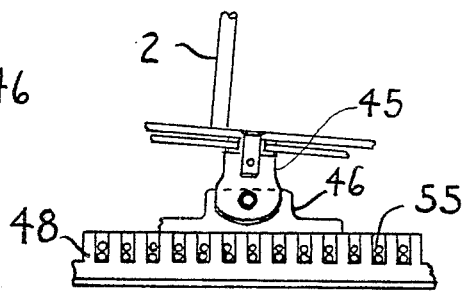
FIG. 14 is a sectional view taken along the lines 14—14 of FIG. 12.

In FIG. 14, there is a sectional view of FIG. 12, taken along the lines 14—14, there is shown another view of the rocker post 45 assembly and the stator windings 55 contained in the stator 48.

OPERATION

As the pedestrian steps on the platform disc 1, or sits down upon the chair 53, as shown in FIG. 13, the articulated platform discs 1 and their lazy tong linked discs 1A are maneuvered through the traffic course by means of the mechanisms heretofore described.

In the various modes of operation, whether utilizing the individual motor drive system of FIG. 5, the integral motor drive system of FIG. 9, or the linear motor drive system of FIG. 12, the slidewalk will operate in substantially the same way. In any event, the platform discs 1 and their articulated co-linked discs 1A will permit inter-action therebetween, by means of the powered rollers system, including drive rollers 25 and 26 working in conjunction with rollers 10, conical rollers 15, 15A, 17 and 17A, riding within V-channels 21 and 54, respectively, to permit a certain amount of slippage which will preclude locking between the rollers, while permitting minor slippage therebetween during the various manipulations of the mechanisms while it traverses curves, straight-aways of varying speeds and effecting safety of transport for the pedestrian or cargo.

Note, that the carrier rollers 10 ride upon the powered drive rollers 25 and 26 at an angle such that a helical path is tranversed along the transport or slidewalk system. The helical path or pitch angle is determined by the relationship between the conical roller posts 13 and 24 and their respective rollers 15, 17, 15A and 17A as they roll in V-channels 21 and 54, respectively. Note, that the V-channel 21 runs essentially parallel to linear movement of the slidewalk while V-channel 54 weaves laterally causing disc 1A to rotate a few degrees accordingly and thereby controlling the angle of roller 10 on post 5 with respect to drive rollers 25 and 26.

The spacing of the V-channels 21 and 54 also affects the pitch distance of the discs 1 and 1A in the same manner that one leg of a right triangle increases as the other leg decreases with the given hypotenuse thereon.

Note, that if the roller drive system were to turn precisely at a uniform speed and assuming that there was no slippage of the carrier rollers 10 then there would be a locking action that would be objectionable and prohibitive. However, since every drive roller can be separately motorized, an induction type motor will allow a one percent (1%) differenec in speed without creating such a difficulty. It is also to be understood that the carrier rollers 10 can slip minutely without affecting the practical operation of the slidewalk drive system.

The foregoing specification and the accompanying drawings constitute a description of the Transportation System in such full, clear and exact terms as to enable any person skilled in the art to practice the invention.

We claim:

1. A transportation system comprising:
   a plurality of load carrying platforms for movement along a continuous closed loop, each platform having two pivot points at opposite sides thereof with one pivot connected to a pivot of the leading platform and the second pivot to a pivot of the trailing platform to be interconnected in a manner to permit lateral displacement of adjacent platforms,
   coupling means for connecting driving energy to said platforms to impart motion thereto, and
   track means for supporting said platforms including at least two members having a variable displacement therebetween, the displacement of said members causing a lateral adjustment between said platforms to provide relatively varying speeds to individual platforms as they traverse different sections of the continuous loop.

2. A transportation system as set forth in claim 1 wherein the coupling means includes a series of drive rollers arranged in a path generally following the path of the continuous loop.

3. A transportation system as set forth in claim 2 wherein said coupling means further includes platform rollers affixed to said platforms and engaging said drive rollers to impart motion to said platforms.

4. A transportation system as set forth in claim 3 wherein the displacement of the members of said track means varies the helical advance of the platform rollers in relationship to the drive rollers to provide relatively varying speeds to said platforms as they traverse different sections of the continuous loop.

5. A transportation system as set forth in claim 1 including bearing supports dependent from alternate platforms of the continuous loop, one of said bearings for each platform engaging one of the members of said track means and a second bearing engaging a second member, the movement of said bearings along their respective members causing a lateral adjustment between said platforms to provide relatively varying speeds thereto as they traverse different sections of the continuous loop.

6. A transportation system comprising:
   a plurality of load carrying platforms interconnected in a manner to permit lateral displacement therebetween, said interconnected platforms forming a continuous closed loop,
   coupling means for connecting driving energy to said platforms to impart motion thereto at varying relative speeds along the length of the continuous loop,
   track means for supporting said platforms including at least two members having a variable displacement therebetween along the length of the continuous loop, and
   bearing support means dependent from alternate platforms of the continuous loop, one of said bearings for each platform engaging one of the members of said track means and a second bearing engaging a second member, movement of said bearings along their respective members causing a lateral displacement of the interconnected platforms to thereby provide relatively varying speeds to said platforms as they traverse different sections of the continuous loop.

7. A transportation system as set forth in claim 6 wherein said coupling means includes:
   a series of drive rollers arranged in a path generally following the path of the continuous loop, and
   a platform roller affixed to each of the bearing carrying platforms and engaging said drive rollers.

8. A transportation system as set forth in claim 7 wherein the displacement of the members of said track means varies the helical advance of the platform rollers in relationship to the drive rollers to provide relatively varying speeds to said platforms as they traverse different sections of the continuous loop.

9. A transportation system as set forth in claim 8 wherein said platforms are interconnected by lazy tong linkages integral with said platforms.

10. A transportation system comprising:
    a first plurality of load carrying platforms flexibly interconnected to form a continuous loop,
    a second plurality of load carrying platforms for movement along a continuous loop, each platform having two pivot points at opposite sides thereof with one pivot connected to a pivot of the leading platform and the second pivot connected to a pivot of the trailing platform in a lazy tong configuration,
    means for driving said first plurality of load carrying platforms at a relatively high rate of speed,
    coupling means for connecting driving energy to said second plurality of interconnected platforms to impart motion thereto, and
    track means for supporting said second plurality of platforms including at least two members having a variable displacement therebetween, the displacement of said members causing a lateral adjustment between platforms in the second continuous loop to provide relatively varying speeds to said second plurality of platforms as they traverse different sections of the continuous loop with at least one speed equal to the speed of the first plurality of platforms such that a load may be transferred from one continuous loop to the other at approximately the same speed.

11. A transportation system as set forth in claim 10 including:
    a third plurality of load carrying platforms for movement along a continuous closed loop, each platform having two pivot points at opposite sides thereof with one pivot connected to a pivot of the leading platform and the second pivot connected to a pivot of the trailing platform in a lazy tong configuration,
    coupling means for connecting driving energy to said third plurality of platforms to impart motion thereto, and
    track means for supporting said third plurality of platforms including at least two members having a variable displacement, the displacement of said members causing a lateral adjustment between platforms in the third continuous loop to provide relatively varying speeds to said third plurality of platforms as they traverse the different sections of the third continuous loop with at least one speed approximately equal to the fixed speed of the first plurality of platforms to enable the transferring of a load from the first continuous closed loop to the third continuous closed loop.

12. A transportation system as set forth in claim 11 wherein the coupling means for connecting energy to the platforms of the second and third continuous loops includes:
    a series of drive rollers connected to the source of driving energy, and
    individual platform rollers affixed to the platforms of the second and third loops and engaging the drive rollers associated therewith to provide relatively varying speeds to said platforms as they traverse different sections of their respective continuous loops.

13. A transportation system as set forth in claim 12 wherein the displacement of the members of said track means for the second and third plurality of load carrying platforms varies the helical advance of the platform rollers in relationship to the drive rollers to provide relatively variable speeds to said platforms as they traverse different sections of the continuous loop.

14. A continuous transportation system for carrying a load comprising:
a power source,
a series of disks connected together to form a closed loop of predetermined length,
power means connected to said power source,
drive means operable by said power means,
driven means including rollers attached to alternate disks operable by said drive means,
a lazy tong connection between adjacent disks permitting lateral displacement therebetween, said lazy tong connections controlling the driven angle of said rollers, and
track means for said disks to guide said disks along said closed loop.

15. In a system of claim 14 in which said closed loop of disks is constructed and arranged to provide variable spacing between disks such that a variable speed of said loops is obtained even though driven by a constant speed drive means.

References Cited

UNITED STATES PATENTS

| | | | |
|---|---|---|---|
| 423,871 | 3/1890 | Judson | 104—166 |
| 1,385,584 | 7/1921 | Peleskey | 104—25 |
| 1,412,896 | 4/1922 | Sachs | 104—25 |
| 1,437,549 | 12/1922 | Putnam | 104—25 |
| 1,632,569 | 6/1927 | Taylor | 104—25 |
| 3,136,266 | 6/1964 | Seidman | 104—18 |

DRAYTON E. HOFFMAN, Primary Examiner

U.S. Cl. X.R.

104—18, 20